Patented Aug. 22, 1950

2,519,999

UNITED STATES PATENT OFFICE 2,519,999

DIALKOXYXYLYLENE-BISQUATERNARY SALTS

Peter L. de Benneville, Philadelphia, Pa., and Richard W. Gormly, Collingswood, N. J., assignors to Rohm & Haas Company, Philadelphia, Pa., a corporation of Delaware No Drawing. Application June 29, 1949, Serial No. 102,147

5 Claims. (Cl. 260—567.6)

This invention relates to 2,5-dialkoxy-1,4-xylylene-bis(alkylbenzyl dimethyl ammonium halides) and to a method for their preparation. These new quaternary ammonium salts provide powerful bactericidal and fungicidal actions and are useful as antiseptics and disinfectants They have the structure

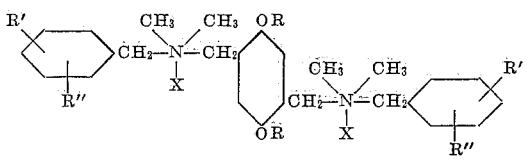

wherein R is an alkyl group of not over two carbon atoms, R' is an alkyl group of seven to nine carbon atoms, R" is hydrogen or the methyl group, and X is a halogen of atomic weight 35 to 80. These compounds may be prepared by reaction by addition of a bishalomethyl-hydroquinone dialkyl ether and an alkylbenzyldimethylamine. Alternatively, they may be prepared by reacting together an alkylbenzyl halide and a dialkyl ether of bis(dimethylaminomethyl) hydroquinone.

The bishalomethylhydroquinone dialkyl ether is prepared by dihalomethylating 1,4-dimethoxybenzene or 1,4-diethoxybenzene by conventional halomethylating procedures. For example, the dimethyl or diethyl ether of hydroquinone is reacted with formaldehyde and hydrogen chloride or bromide or is reacted with paraformaldehyde and concentrated hydrochloric or hydrobromic acid. The reaction is desirably carried out in the presence of an inert organic solvent, such as ethylene dichloride, carbon tetrachloride, or the like, at temperatures from 30° to 100° C. for a period of time between two and twenty-four hours until two halomethyl groups have been introduced.

The dihalomethylated hydroquinone dialkyl ether is reacted with an alkylbenzyldimethylamine in which the alkyl group contains seven to nine carbon atoms. This reaction is desirably carried out in the presence of an inert organic solvent, such as benzene, toluene, xylene, naphtha, ethylene dichloride, acetonitrile, nitromethane, or the like, by heating up to reflux temperatures. The presence of solvent is not essential; however, when the reaction is sufficiently advanced, solvent may be stripped off by heating under reduced pressure to leave the quaternary salt.

In the alternate procedure, the halomethylated hydroquinone dialkyl ether is first reacted with dimethylamine. Excess amine may be used to take up the hydrogen halide of reaction or a strong base, such as caustic soda, may be used for this purpose.

The reaction is desirably done in an inert solvent, such as benzene, toluene, or naphtha. The amine salt or an alkali metal halide is separated out.

The bis(dimethylaminomethyl) hydroquinone dialkyl ether is then recovered and in turn reacted with an alkylbenzyl halide in which the alkyl group contains seven to nine carbon atoms.

The alkylbenzyl halides required for either method are prepared in accordance with the general procedure described by deBenneville and Bock in application Serial No. 28,274, filed May 20, 1948. An alkylbenzene, or alkyltoluene, the two being essentially equivalent for purposes of this invention, the alkyl group whereof contains seven to nine carbon atoms, is halomethylated by reaction with anhydrous formaldehyde and hydrogen chloride or bromide in the presence of a catalyst mixture formed by mixing one molecular proportion of zinc chloride with two to eight molecular proportions of an aliphatic monocarboxylic acid of one to three carbon atoms, such as formic, acetic, chloroacetic, or propionic. Acid anhydrides are equivalent to the acids and may be used in lieu thereof or admixed therewith. Formaldehyde may be used as a gas or as a revertible polymer. The equivalent of formaldehyde and hydrogen bromide or chloride is obtained by use of bromomethyl ether or chloromethyl ether.

For one molar proportion of an alkylbenzene there are used from one to 2.5 molar proportions of formaldehyde and 0.75 to 2.5 molar proportions of zinc chloride associated with the proportion of monocarboxylic acid specified above. Reaction temperatures are usually between 50° and 100° C. Under these conditions, halomethylation is readily carried to monohalomethylation without formation of troublesome resinous by-products.

For purposes of the present invention, alkylbenzenes or alkyltoluenes are taken are starting materials where the alkyl groups vary from heptyl to nonyl. The exact form of these groups does not appear to be of particular importance. They may be of straight or branched chain structure and may be primary, secondary, or tertiary. The relative position of the alkyl group relative to the halomethyl group or to the methyl group in the alkyl toluenes is not important.

Preparation of the above alkylated hydrocarbons follows known methods. Benzene, for example, may be reacted with an acyl halide and the acyl group thus introduced is reduced to an alkyl group. By other procedures olefinic hydrocarbons of seven to nine carbon atoms are reacted with benzene or toluene in the presence of an acidic catalyst. There are thus available heptylbenzene, heptyltoluene, octylbenzene, octyltoluene, nonylbenzene, and nonyltoluene in their various isomeric forms.

The preparation of intermediates and of the desired quarternary ammonium salts will be further described with the aid of illustrative examples. Parts shown are by weight.

Example 1

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid, while the mixture was stirred and maintained at 5° C. The reaction mixture was stirred for three hours while the temperature was carried to 30° to 40° C. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7% compared with theoretical contents of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and allowed to stand to form layers. The layers were separated. The upper layer was washed with water, with sodium bicarbonate solution, and again with water and was distilled. The fraction collected at 127°–132° C./2 mm. amounting to 128 parts, corresponded in composition to heptylbenzyl chloride.

Example 2

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67,557 (1945)). The reaction mixture was stirred for three hours at room temperature and the layers were separated. The product layer was twice washed with concentrated sulfuric acid and distilled. The fraction taken at 93°–95° C./0.3 mm. corresponded in composition with sec.-octylmethylbenzene.

To a mixture of 81 parts of this product, 47.5 parts of zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was taken, washed with water and sodium bicarbonate solution and distilled. The fraction coming over at 130°–150° C./0.3 mm. amounted to 43.8 parts and corresponded in composition to methyloctylbenzyl chloride.

Example 3

To a mixture of 138 parts by weight of toluene and 90 parts of anhydrous hydrogen fluoride, contained in a copper flask and held at 0°–10° C. there was added 336 parts of mixed octenes, boiling at 123°–134° C. The rate of addition was such that the temperature did not rise above 10° C. The reaction mixture was stirred for an hour and then poured on ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in a reaction vessel equipped with a stirrer of 32 parts of the above octyltoluene, 50 parts of anhydrous zinc chloride, and 110 parts of glacial acetic acid. With the temperature maintained at 50° to 60° C. there was added to this mixture 25 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

Example 4

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts of this product to a stirred mixture of 159 parts of benzene and 147 parts of sulfuric acid. The temperature was allowed to rise to 100° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of this nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water and with sodium bicarbonate solution, dried over sulfate, and distilled. The fraction distilling at 141°–142° C./2 mm. was nonylbenzyl chloride.

Example 5

To a mixture of 46.5 parts of 2-octylbenzene, 17 parts of anhydrous zinc chloride, and 40 parts of glacial acetic acid there was added dropwise 50 parts of bis(bromomethyl)ether. The mixture was stirred and heated at 70° C. for four hours. Layers were allowed to form and were separated. The upper layer was washed with hot water, with 10% sodium bicarbonate solution, and with water. It was dried over sodium sulfate and distilled. At 155°–174° C./2 mm. there was obtained a fraction which corresponded in

Example 6

Hydrogen chloride was passed for 3.5 hours into a mixture of 63.5 parts of 1,4-dimethoxybenzene, 30 parts of paraformaldehyde, 60 parts of concentrated hydrochloric acid, and 100 parts of carbon tetrachloride, while the mixture was stirred and heated to reflux temperatures. The mixture was cooled and the product obtained as a solid by filtering the mixture through fritted glass. It was dried and recrystallized from a mixture of benzene and ligroin to yield 48 parts of 1,4-dimethoxy-2,5-bis(chloromethyl)benzene, the bischloromethylation product of hydroquinone dimethyl ether.

Example 7

Hydrogen chloride was passed for 12 hours into a mixture of 50 parts of 1,4-diethoxybenzene, 19.8 parts of paraformaldehyde, 60 parts of concentrated hydrochloric acid, and 100 parts of carbon tetrachloride, while the mixture was stirred and heated at reflux temperature. The mixture was allowed to stand over night. A light tan solid precipitated out and was filtered off. It was dried and recrystallized from a mixture of benzene and naphtha to yield 18.8 parts of 1,4-diethoxy-2,5-bis(chloromethyl)benzene.

The above procedures may be followed for bromethylating the hydroquinone ethers by substituting hydrogen bromide for hydrogen chloride. The same end products are obtainable by use of chloro- or bromo-methyl ether and introducing thus two halomethyl groups.

Example 8

Dimethylamine gas was passed into a solution of 100 parts of 1,4-dimethoxy-2,5-dichloromethylbenzene in 300 parts of benzene in a reaction vessel in an ice bath. When the initial reaction had been completed, the reaction mixture was heated at reflux temperatures for an hour while dimethylamine was passed into the mixture. The reaction mixture was then cooled in an ice bath and allowed to stand for several hours. The dimethylamine hydrochloride which had separated was filtered off and the solvent evaporated to leave practically pure 1,4-dimethoxy-2,5-bis(dimethylaminomethyl)benzene.

The same procedure applied to 1,4-diethoxy-2,5-dichloromethylbenzene yields 1,4-diethoxy-2,5-bis(dimethylaminomethyl)benzene.

Example 9

A mixture of 25.2 parts of 1,4-dimethoxy-2,5-bis(dimethylaminomethyl)benzene, 56.6 parts of p-2-octylbenzyl bromide, and 150 parts of benzene was heated on a steam bath for six hours. The solvent was distilled off and the residue heated for an hour under low pressure to strip off traces of benzene. There was obtained 80 parts of a solid which corresponded in composition with dimethoxyxylylene-bis(octylbenzyl dimethyl ammonium bromide).

Against *Salmonella typhosa* this compound has a phenol coefficient of 600 and against *Staphylococcus aureus* a phenol coefficient of 1100.

The same bromide is obtained by heating together for two hours under reflux 32.4 parts of 1,4-dimethoxy-2,5-bis(bromomethyl)benzene and 50 parts of octylbenzyldimethylamine in 200 parts of benzene. Some solid is obtained when the mixture is cooled and filtered and more upon evaporation of solvent.

The products obtained have phenol coefficients of 610 against *Salmonella typhosa* and 1100 against *Staphylococcus aureus*.

The reaction of 28 parts of 1,4-diethoxy-2,5-bis(dimethylaminomethyl)benzene and 56.6 parts of p-2-octylbenzyl bromide as above leads to formation of 1,4-diethoxy-2,5-xylylene bis-(octylbenzyl dimethyl ammonium bromide), which has phenol coefficients of 630 against *Salmonella typhosa* and 930 against *Staphylococcus aureus*.

Example 10

To a solution of 8 parts of sodium hydroxide in 30 parts of water there was added 22.5 parts of an aqueous 40% dimethylamine solution. The reaction vessel in which this mixture was formed carried a refluxing system cooled with dry ice and acetone. To the mixture there was added 22.5 parts of heptylbenzyl chloride. The mixture was heated to give gentle refluxing and dimethylamine gas was slowly passed in during a period of three hours. The reaction mixture was allowed to form layers which were separated. The product layer was washed with water until neutral to litmus and heated under reduced pressure. There was obtained 20 parts of a light yellow oil which had the proper analysis for heptylbenzyldimethylamine.

Example 11

The procedure of Example 10 was followed with substitution of 25.3 parts of nonylbenzyl chloride in place of the 22.5 parts of heptylbenzyl chloride. There was obtained 18 parts of product which corresponded by nitrogen analysis to nonylbenzyldimethylamine.

The procedure was repeated with p-1,3,5,5-tetramethylpentylbenzyl chloride and a similar product obtained, p-(1,3,5,5-tetramethylpentyl)-benzyldimethylamine.

Example 12

The procedure of Example 10 was followed with use of 23.8 parts of p-2-octylbenzyl chloride as the alkylbenzyl halide. The product obtained was (2-octylbenzyl)dimethylamine.

Example 13

A mixture of 23.5 parts of 1,4-dimethoxy-2,5-bischloromethylbenzene and 55 parts of nonylbenzyldimethylamine was heated for three hours at 100° C. The product contained 9.3% ionizable chlorine and was dimethoxyxylylene bis(nonylbenzyl dimethyl ammonium chloride).

This compound has a phenol coefficient of 720 against *Salmonella typhosa* and of 1000 against *Staphylococcus aureus*.

Example 14

There were mixed 27 parts of 1,4-dimethoxy-2,5-bis(chloromethyl)benzene, 62 parts of octylbenzyldimethylamine, and 200 parts of benzene. The mixture was heated under reflux for two hours. The desired product separated as a solid which was filtered off and dried. There was thus obtained 80 parts of dimethoxyxylylene bis(octylbenzyl dimethyl ammonium chloride). The product as obtained had an ionizable chlorine content of 10.0% (theory 10.2%).

The phenol coefficient for this product is 885 against *Salmonella typhosa* and 1000 against *Staphylococcus aureus*.

Example 15

A mixture of 23.5 parts of 1,4-dimethoxy-2,5-bis(chloromethyl)benzene, 46.6 parts of heptylbenzyldimethylamine, and 180 parts of benzene was heated under reflux for two hours and cooled. The solid which precipitated was filtered off and dried. It corresponded in composition to dimethoxyxylylene bis(heptylbenzyl dimethyl ammonium chloride).

Example 16

There were mixed 23.5 parts of dimethoxy bis(chloromethyl)benzene, 52.4 parts of (methyloctylbenzyl)dimethylamine, and 200 parts of benzene. The mixture was heated under reflux for four hours and cooled. The solid which was present was filtered off and dried. It corresponded in composition to dimethoxyxylylene bis(methyloctylbenzyl dimethyl ammonium chloride).

It gave a value for the phenol coefficient, as determined by the F. D. A. method, of 900 against *Staphylococcus aureus* and of 810 against *Salmonella typhosa*.

Example 17

A mixture of 26.3 parts of 1,4-diethoxy-2,5-bis(chloromethyl)benzene, 53 parts of octylbenzyldimethylamine, and 200 parts of benzene was heated at refluxing temperatures for three hours. The solid which was formed was filtered off and dried. It amounted to 72 parts and corresponded closely in composition to diethoxyxylylene bis(octylbenzyl dimethyl ammonium chloride). The product as obtained contained 9.1% of ionizable chlorine (theory 9.37%).

This product has a phenol coefficient of 555 against *Salmonella typhosa* and 855 against *Staphylococcus aureus*.

These quaternary ammonium halides exhibit marked fungicidal action. They inhibit germination of spores of *Sclerotinia fructicola* and *Macrosporium sarcinaeforme* Cav at 0.001% to 0.005%. They have marked capillary activity as demonstrated by the low surface tensions of aqueous solutions and the low interfacial tensions between their aqueous solutions and oil.

We claim:

1. As new chemical substances, compounds of the formula

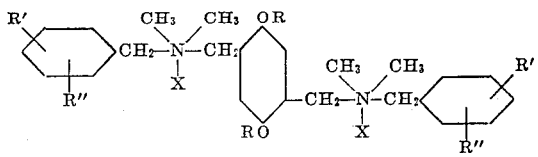

wherein R is an alkyl group of not over two carbon atoms, R' is an alkyl group of seven to nine carbon atoms, R'' is a member of the class consisting of hydrogen and the methyl group, and X is a halogen of atomic weight 35 to 80.

2. As new chemical substances, compounds of the formula

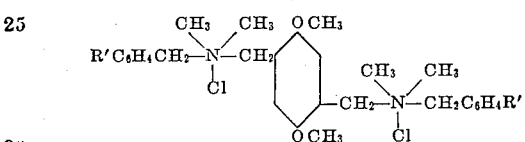

wherein R' is an alkyl group of seven to nine carbon atoms.

3. A compound of claim 2 where R' is a heptyl group.

4. A compound of claim 2 where R' is an octyl group.

5. A compound of claim 2 where R' is a nonyl group.

PETER L. DE BENNEVILLE.
RICHARD W. GORMLY.

No references cited.